United States Patent
Jakubiak et al.

(10) Patent No.: US 11,656,976 B2
(45) Date of Patent: May 23, 2023

(54) SYSTEM AND METHOD FOR ELEMENT LOCATOR RECOMMENDATIONS FOR A UI APPLICATION

(71) Applicant: PARASOFT CORPORATION, Monrovia, CA (US)

(72) Inventors: Nathan Michael Jakubiak, Pasadena, CA (US); Anthony David Yoshicedo, Honolulu, HI (US); Joseph Adam Benken, San Dimas, CA (US)

(73) Assignee: PARASOFT CORPORATION, Monrovia, CA (US)

( * ) Notice: Subject to any disclaimer, the term of this patent is extended or adjusted under 35 U.S.C. 154(b) by 229 days.

(21) Appl. No.: 17/221,259

(22) Filed: Apr. 2, 2021

(65) Prior Publication Data

US 2021/0311862 A1    Oct. 7, 2021

Related U.S. Application Data

(60) Provisional application No. 63/004,392, filed on Apr. 2, 2020.

(51) Int. Cl.
*G06F 11/36* (2006.01)
*G06F 40/14* (2020.01)
*G06F 9/451* (2018.01)

(52) U.S. Cl.
CPC .......... *G06F 11/3688* (2013.01); *G06F 9/451* (2018.02); *G06F 11/3676* (2013.01); *G06F 11/3684* (2013.01); *G06F 40/14* (2020.01)

(58) Field of Classification Search
CPC ............. G06F 11/3688; G06F 11/3676; G06F 11/3684; G06F 11/36; G06F 9/451
See application file for complete search history.

(56) References Cited

U.S. PATENT DOCUMENTS

| | | | | |
|---|---|---|---|---|
| 8,655,913 B1 * | 2/2014 | Shah | ................... | G06F 16/8373 707/780 |
| 9,760,475 B2 * | 9/2017 | Zhang | ................. | G06F 11/3688 |
| 9,946,637 B2 * | 4/2018 | Zhang | ................. | G06F 11/3688 |
| 10,474,564 B1 * | 11/2019 | Konyshev | ........... | G06F 11/3688 |
| 10,719,432 B1 * | 7/2020 | Konyshev | ........... | G06F 11/3688 |
| 2005/0229043 A1 * | 10/2005 | Nasuti | ................. | G06F 11/3688 714/38.1 |
| 2012/0151268 A1 * | 6/2012 | Dearing | ............. | G06F 11/3624 714/38.1 |

(Continued)

*Primary Examiner* — Kamini B Patel
(74) *Attorney, Agent, or Firm* — Lewis Roca Rothgerber Christie LLP (57) ABSTRACT

System and method for element locator recommendations for testing a UI application include: executing tests; monitoring tests and observing which commands are called by each test to generate monitored data, where the monitored data includes which tests were executed, element locators that were used in the tests, relevant commands that were called by each test and related to the element locators that were used in the tests, and information about the UI application during the test execution; storing the monitored data; analyzing the stored monitored data; producing a set of recommended element locators to be used in place of previously used element locators for which the elements were not found during the execution of the tests; and utilizing the set of recommended element locators to complete the testing of the UI application software.

20 Claims, 6 Drawing Sheets

(56) References Cited

U.S. PATENT DOCUMENTS

| | | | |
|---|---|---|---|
| 2012/0204091 A1* | 8/2012 | Sullivan | G06F 11/3664 |
| | | | 715/234 |
| 2015/0370688 A1* | 12/2015 | Zhang | G06F 11/368 |
| | | | 717/125 |
| 2015/0370694 A1* | 12/2015 | Zhang | G06F 11/3688 |
| | | | 717/124 |
| 2016/0196021 A1* | 7/2016 | Rahulkrishna | G06F 11/3688 |
| | | | 715/760 |
| 2017/0324803 A1* | 11/2017 | Shaath | G06F 11/36 |
| 2018/0129483 A1* | 5/2018 | Biddle | G06F 11/3668 |
| 2020/0042578 A1* | 2/2020 | Wu | G06F 40/186 |
| 2020/0242017 A1* | 7/2020 | Konyshev | G06F 11/3692 |
| 2020/0249964 A1* | 8/2020 | Fernandes | G06F 9/451 |
| 2021/0049234 A1* | 2/2021 | Kumar | G06F 40/194 |
| 2021/0173768 A1* | 6/2021 | Konyshev | G06N 3/04 |
| 2021/0216444 A1* | 7/2021 | Gefen | G06F 11/3688 |
| 2021/0294733 A1* | 9/2021 | Jena | G06F 11/368 |
| 2021/0326247 A1* | 10/2021 | Mohan | G06F 11/3676 |
| 2022/0374334 A1* | 11/2022 | Brown | G06F 11/3688 |

\* cited by examiner

Matched nodes "button" and "a"

SYSTEM AND METHOD FOR ELEMENT LOCATOR RECOMMENDATIONS FOR A UI APPLICATION

CROSS-REFERENCE TO RELATED APPLICATIONS

This patent application claims the benefits of U.S. Provisional Patent Application Ser. No. 63/004,392, filed on Apr. 2, 2020, and entitled "System and Method for Locator Recommendations for a Web Application," the entire content of which is hereby expressly incorporated by reference.

FIELD OF THE INVENTION

The disclosed invention relates generally to software testing; and more particularly to a system and method for locator recommendations for a User Interface (UI) application, such as a web application.

BACKGROUND

Web interface automation applications, for example, Selenium™, have been increasingly used for automating user interaction of web applications within a web browser for testing purposes. For example, Selenium WebDriver™ provides an Application Programming Interface (API) for users to define how to interact with the web application, such as clicking on a page element or typing into a text field. The API is available in several different programming languages, with the most widely used language being Java. While web application-based tests are powerful and very useful, they suffer from many problems that are common to tools that test user interfaces (UI).

First, the tests may start failing because the UI of the application changes in such a way that the tests can no longer locate the elements using the element locators defined in the tests. Examples are when a visible property of the element changes (such as the name of a button), or the location of an element changes (it was moved from the top to the bottom of the page), or when an invisible property of the element changes, such as when the id changes—the id is not visible to the user, but an element locator that is finding an element by id will start failing to find the element. It is also possible that a combination of these kinds of changes can occur all at the same time.

Furthermore, the properties of elements that are commonly used in element locators can be dynamic in nature and change each time the user accesses the application. For instance, an id property that is unique each time the application is accessed. In these cases, the user must determine how to locate the element using static properties that uniquely identify it.

Also, wait conditions in UI tests are by nature sensitive to timing issues in the application, since they depend on a predefined timeout period within which the test needs to wait for the element to appear. If the application or test is run in different environments, the wait conditions may succeed in one environment but fail in a second environment. This may be due to various environmental factors, such as network speed, available CPU or RAM, or other programs running in the same environment.

When tests fail in one of these ways, they have a negative impact on test automation engineers who must spend substantial time reviewing the test failures. The engineer needs to determine whether the tests are failing because the application broke, because the application underwent expected changes without the tests being updated, or whether the tests are simply unstable. As a result, the engineer must identify why the test is failing and find an appropriate fix. Consequently, engineers spend a large amount of time reviewing failures and updating the tests accordingly. In a recent survey, test automation engineers indicated that they spend on average ⅓ of their working time reviewing and fixing tests broken in this way. The engineers often must use different techniques to understand how to change their tests, including usage of developer tools provided by the browsers, $3^{rd}$-party browser extensions, and trial and error approaches (running and re-running tests after making changes to see if the changes were sufficient).

SUMMARY

Present disclosure is directed to a method and a system for element locator recommendations for testing a User Interface (UI) application software. For example, when a test fails to find an element defined by an element locator, the disclosure uses saved historical data for underlying attributes as well as the data about the current state of the application to determine one or more new element locators that could be used in the test. The method and system reduce the amount of time spent on maintaining failing tests and increase the accuracy of the tests by capturing data about the steps taken by the test and the state of the application at each step and utilizing historical data and the current state of the application to determine new element locators that may be used in the test.

In some embodiments, the disclosed invention is a method for element locator recommendations for testing a User Interface (UI) application software by a test tool. The method includes: executing a plurality of tests by the test tool; monitoring tests as they are executed and observing which commands of the test tool are called by each test being executed to generate monitored data, wherein the monitored data includes which tests were executed, element locators that were used in the tests, relevant commands that were called by each test and related to the element locators that were used in the tests, and information about the UI application software during the test execution; storing the monitored data in a recorded data repository; analyzing the monitored data stored in the recorded data repository; producing a set of recommended element locators to be used by the test tool in place of previously used element locators for which the elements were not found during the execution of the tests; and utilizing the set of recommended element locators to complete the testing of the UI application software.

In some embodiments, the disclosed invention is a system for element locator recommendations for testing a UI application software by a test tool. The system includes: a software test tool for executing a plurality of tests by the test tool; a monitor for monitoring tests as they are executed and observing which commands of the test tool are called by each test being executed to generate monitored data, wherein the monitored data includes which tests were executed, element locators that were used in the tests, relevant commands that were called by each test and related to the element locators that were used in the tests, and information about the UI application software during the test execution; a data repository for storing the monitored data; and a locator creation engine for analyzing the monitored data stored in the data repository, and producing a set of recommended element locators to be used by the test tool in place of previously used element locators for which the elements were not found during the execution of the tests. The software test tool then utilizes the set of recommended element locators to complete the testing of the UI application software In some embodiments, analyzing the monitored data comprises identifying a page element within the DOM structure that was stored when the command was executed. The disclosure may further create a set of locators by analyzing the identified page element and the associated DOM structure of a page that includes the identified page element, and utilize the associated DOM structure to identify the page element, and identifying the relevant command from a previous test run that matches the relevant command under analysis. In some embodiments, the page element may be identified by matching a DOM structure in a test run under analysis with a DOM structure from a previous test run. In some embodiments, the page element may be identified by creating a second set of locators for an associated DOM structure for a previous test run and using the second set of locators to identify the associated page element.

In some embodiments, the disclosure calculates a score for each recommended element locator to produce a scored list of recommended locators; and uses the score by a machine learning engine to determine a best element locator to use in place of a previously used element locator.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

DETAILED DESCRIPTION

The disclosure reduces the amount of time that automation engineers (testers or developers) spend on maintaining failing tests. In some embodiments, the disclosure captures data about the steps taken by the test and the state of the application at each step, each time an automated test executes. When a test fails to find an element defined by an element locator, the disclosure uses saved historical data for underlying attributes as well as the data about the current state of the application to determine one or more new element locators that could be used in the test.

A typical example of a Java-based web application (e.g., Selenium™) test looks like this:

```
public class LoginTest {
    @Test
    public void testLogin( ) {
        WebDriver driver = new ChromeDriver( );
        try {
            driver.get("http://parabank.parasoft.com/parabank/index.htm");
            driver.manage( ).window( ).maximize( );
            findElementAndWaitUntilClickable(By.name("username"), driver).sendKeys("john");
            findElementAndWaitUntilClickable(By.name("password"), driver).sendKeys("demo");
            findElementAndWaitUntilClickable(By.cssSelector(".button:nth-child(1)"), driver).click( );
            findElementAndWaitUntilClickable(By.linkText("Log Out"), driver).click( );
        } finally {
            driver.close( );
            driver.quit( );
        }
    }
    private static WebElement findElementAndWaitUntilClickable(By by, WebDriver driver) {
        return new WebDriverWait(driver, 10000).until(elementToBeClickable(by));
    }
}
```

There are two main parts of defining an interaction with a page element in a web application. The first is to call a command to locate the element, and the second is to call a command that will perform the desired interaction with that element. To locate an element, the user defines the strategy to be used to locate the element, along with the value for which the strategy will search. A typical UI (web) application testing framework, such as a Selenium™ framework, provides different strategies which can be used to locate an element, such as the following:
Id
Name
Link text
Partial link text
Tag name
Class name
CSS (Cascading Style Sheets) selector
XPath (XML Path Language)

In the example above, the username and password fields are located using the "name" location strategy (By.name("username") and By.name("password")), the first button is located using the "CSS selector" location strategy (By.cssSelector(".button:nth-child(1)")), and the log out button is located using the "Link text" location strategy (By.linkText("Log Out")). The combination of location strategy and value for which to search is often called an "element locator". The element locator is used in conjunction with the commands of UI automation applications, for example, the Selenium™ command driver findElement (by) to locate the elements. See, for instance, https://blog.thedigitalgroup.com/locator-strategies-in-selenium-webdriver, for examples of different common strategies for locating elements.

Moreover, in locating an element, the test that interacts with the element often needs to be configured to wait until the element appears within the application. In many UI applications, the screen is partially rendered while additional data is fetched or calculated in the background, and then the final rendering will appear once the data is available. In these situations, the test needs to be configured to repeatedly search for the element until it appears. This repeated search is often called a "wait", and usually has a timeout associated with it—if the element is not found within the timeout, then the test will fail. The wait, along with the condition it is waiting for, is often called a "wait condition". In the example above, the code "return new WebDriverWait(driver, 10000) .until(elementToBeClickable(by));" performs the wait until the element is present and available to be clicked on.

Once an element is found, the desired interaction is performed on it. In the example above, the sendKeys( ) and click( ) calls are the Selenium™ commands that perform the interactions of typing into a text field and clicking a button, respectively. In many cases, when the property or location of a page element changes, the tester determines how to update the element locator in the test to find the element based on the new state of the page element. But, when the property of a page element is dynamic in nature, the tester determines how to update the element locator to use static but uniquely identifying attributes of the element. Moreover, when wait conditions fail, the tester needs to identify how to modify the wait condition by changing the condition for which it is waiting, or by increasing the timeout.

In some embodiments, the disclosure observes how the page changed over time and the historical values for underlying attributes of the page elements and produces a confidence factor for each recommended locator that is based on how often a locator of that type would have had a consistent value when created for each of the historical test runs.

These locators can then be used in different ways, for example:
1. They can be included into an HTML report that is generated after the test run. A tester can review the report to identify ways to improve their tests.
2. They can be included into a JSON report that is generated after the test run, which can be imported into an IDE plugin that can automatically update the user's Selenium™ code to use an updated locator chosen by the user.
3. They can be used by the disclosure at runtime to attempt to "self-heal" the test when an element locator fails to find an element, by substituting the "best" recommended locator (based on a confidence factor) to see if it would find the element and allow the test to proceed without failing.

Figure 1:
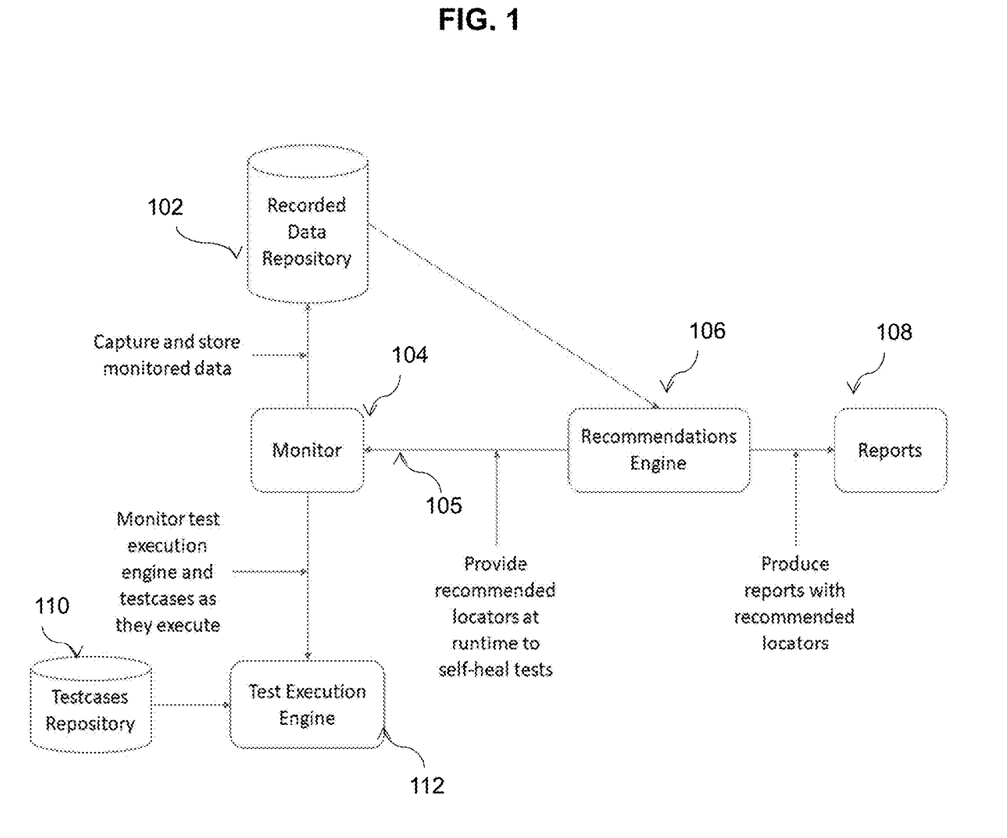
FIG. 1 shows a block diagram of an exemplary environment, according to some embodiments of the disclosed invention.

FIG. 1 shows a block diagram of an exemplary environment, according to some embodiments of the disclosed invention. As shown, a monitor 104 (e.g., a monitoring engine executing a monitoring software) monitors tests as they are executed by the test execution engine 112 and captures and stores relevant monitored data into a recorded data repository 102. The monitored data can include which tests were executed, the element locators that were used and the Selenium™ commands that were called by each test, as well as other data about the test execution or the state of the application during the test (See FIG. 3 for more examples of the data that is monitored and stored.) The test execution engine 112 executes testcases stored in a testcase repository 110. The recommendations engine 106 is responsible for analyzing data that has been stored within the recorded data repository 102 and producing a set of recommended locators 105 that can be used instead of a previously defined locator.

The recommendations engine can be used by the monitor 104 at runtime as tests execute in order to attempt to self-heal element locators in tests that would otherwise fail, and/or it can be used after test execution to produce a report 108 that can then be consumed by a user or by other tooling to provide insight about how to improve the tests. In some embodiments, the testcases are written as Java™ classes and are stored within a source control management system.

The monitor 104 may also perform "self-healing of wait conditions" which may be enabled or disabled by users of the system and method. For example, when a test is about to fail because an element cannot be found, the monitor may inject additional time for a wait condition to complete, in case the timeout specified for the wait condition in the testcase was not long enough and waiting longer would allow it to complete successfully. In some embodiments, the monitor 104 may also reconfigure a wait condition to ignore certain types of exceptions, in cases when they get thrown during the execution of the wait. If no wait condition was present in the test, the monitor may inject a wait condition to see if adding the wait would cause the test to succeed. These are examples of different ways that the monitor may attempt to adjust and/or add wait conditions to see if doing so would cause the appropriate page elements to be found. The monitor may attempt to self-heal the element locator and the wait for that element at the same time.

The tests are written within a test framework. The test framework is used to define each test and is responsible for execution of the tests. There are many known test frameworks in the industry that are used for writing and running web application tests, for example, JUnit™, TestNG™, and Cucumber™. The monitor monitors the test framework to understand what test is currently running, so that it can record the data that it captures about the steps taken by each test and the state of the application during the test within the context of the test that is running. In some embodiments, the disclosure saves the data for each execution of a set of tests as a "session", where each session contains information for each individual test that was executed.

Although, a web application is used here as an example, one skilled in the art would recognize that the present disclosure applies to all types of UI applications, as long as a Document Object Model (DOM) representation of a UI can be captured and a test framework exists that uses locators based on that UI representation.

Figure 2:
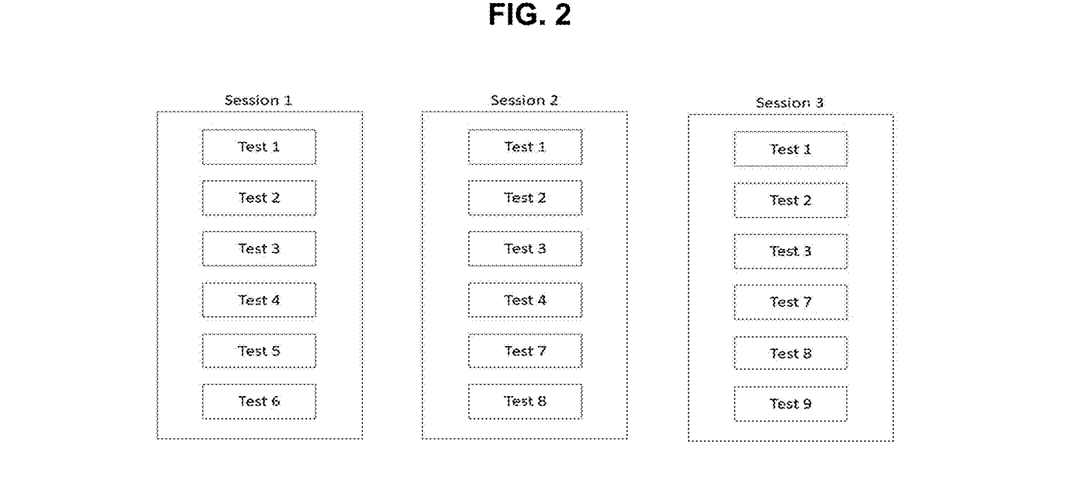
FIG. 2 depicts some exemplary test sessions, according to some embodiments of the disclosed invention.

FIG. 2 depicts some exemplary test sessions (Session 1, 2 and 3), according to some embodiments of the disclosed invention. Each test session contains relevant data for each test that was run and was monitored by the monitor. It is not necessary that the exact same set of tests be executed in each session, for instance, a given test may only be included in a subset of the total sessions that were run.

Test cases contain code that performs calls to testing tool interface, such as Selenium™ APIs, which describe what steps are to be taken to test a web application. The monitor monitors these API calls to capture relevant data for each test that is executed. It observes which Selenium™ APIs (commands) are called by each test and captures the commands it considers to be relevant to the element locators. For example, some relevant commands for Selenium™ include findElement, sendKeysToElement (which represents typing into a text field), and clickElement, among others. In some embodiments, an example of commands that may be captured include:

Navigate to URL A
Find Element B
Type into Element B
Find Element C
Type into Element C
Find Element D
Click on Element D The monitor records relevant data for each command, such as the element locator used in the findElement command, the text that is typed into a text field by sendKeysToElement, and other similar kinds of data. For each findElement command, it also captures the current Document Object Model (DOM) structure of the web application at the moment that the command is executed and associates it with that command. The DOM is a data model accompanied with a programming interface for HTML and XML documents that represents the current state of an (UI) application so that programs can change the document structure, style, and content. The DOM represents the document as nodes and objects. That way, programming languages can connect to the application. A DOM can be displayed in a browser or represented as the HTML or XML source. Regardless of how the UI (web) application is represented, it is the same document in both cases. The DOM is an object-oriented representation of the web page, which can be modified with a scripting language such as JavaScript™ and represents that same document so it can be manipulated.

In some embodiments, the data that is captured for each command may include:

Command name;
Data passed to the command;
Whether the command succeeded or failed;
The element locator for the page element with which the command is associated;
DOM structure of the UI (web) application at the moment the command is executed; and/or
An absolute XPath to the page element that was found using the element locator within the DOM structure of the page.

Figure 3:
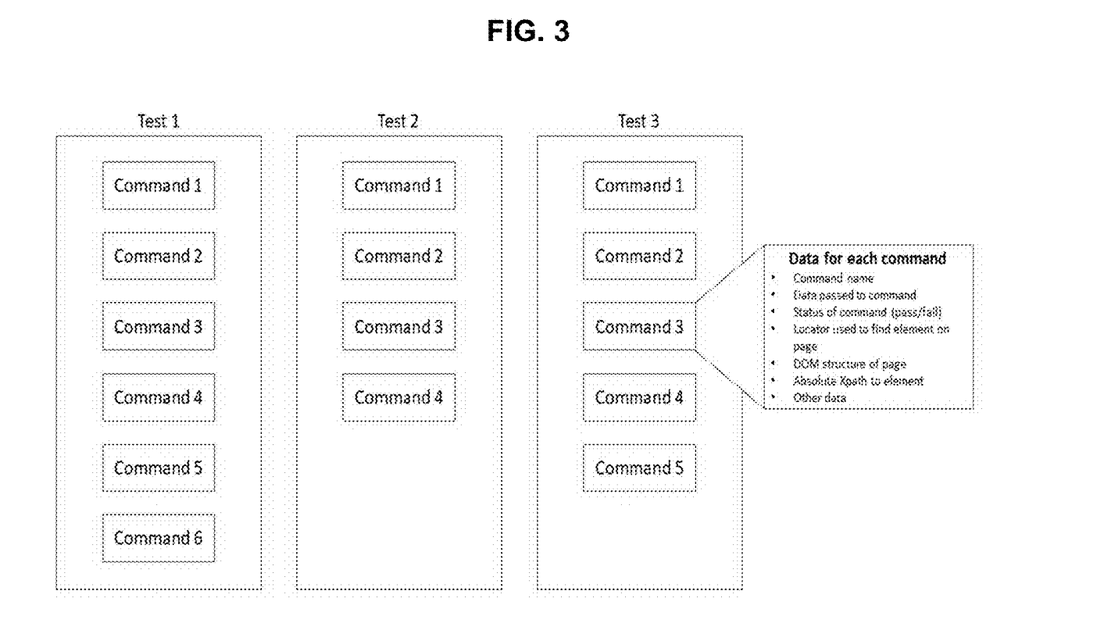
FIG. 3 illustrates some exemplary data captured for each test, according to some embodiments of the disclosed invention.

The data captured for each test during a session may look similar to the data shown in FIG. 3.

FIG. 3 illustrates some exemplary data captured for each test, according to some embodiments of the disclosed invention. As shown, each of the tests for each session in FIG. 2, may include a plurality of commands. The data for each command may include, for example, command name, data passed to the command, status of the command (e.g., whether the command successfully completed or not), element locator for the page element with which the command is associated, DOM structure of the web application at the moment at which the command is executed, absolute XPath within the DOM structure of the application that represents a way to identify the page element with which the command is associated, and/or other data.

In some embodiments, a monitor (e.g., monitor 104 in FIG. 1) monitors API calls made by both the test code and the test framework, capturing relevant data from those API calls. In some embodiments, the monitor is implemented as a Java agent that is attached to the test execution process. However, as one skilled in the art would recognize, there are other possible ways that the API calls can be monitored. Test frameworks often provide a way for a user to extend their functionality. For example, some test frameworks have an Extension API that allows a user to define an extension that can be notified and take actions when certain test events occur, such as when a specific test starts or finishes execution. API calls within the test framework may be monitored by defining an extension using the Extension API.

Other test frameworks may have other similar methods for monitoring what happens as tests execute in their framework. Another way to monitor the API calls made to the Selenium™ API would be to leverage the W3C WebDriver protocol. For example, Selenium™ WebDriver uses the W3C WebDriver protocol to enable communication between the test process that is making the API calls and a WebDriver server that controls the browser process. In some embodiments, a custom WebDriver server may be created that is a proxy between the test code and the normal WebDriver server, that monitors the commands that are sent using the W3C WebDriver protocol.

Figure 4:
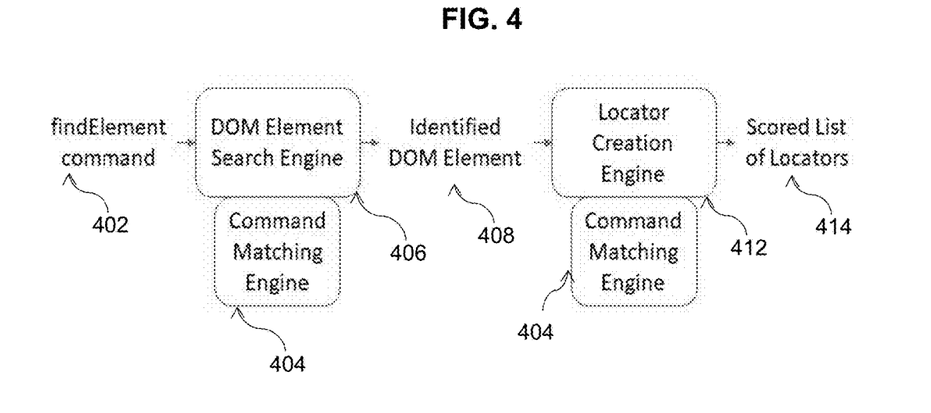
FIG. 4 illustrates an exemplary block diagram of a recommendation engine, according to some embodiments of the disclosed invention.

FIG. 4 illustrates an exemplary block diagram of a recommendation engine, according to some embodiments of the disclosed invention. The recommendations engine creates a set of locators that could be used in place of an existing locator within a test. These locators are candidates to be used to improve the existing locator, because the existing locator failed when the test was last run, or because the existing locator could be more resilient to changes in the page structure. As shown, the recommendations engine uses three main components: a DOM Element Search Engine 406, a Command Matching Engine 404, and a Locator Creation Engine 412 to produce a new set of locators 414. Each of these components operates on data that is stored in a recorded data repository (such as 102 in FIG. 1), by a monitor.

For a given command 402, for example a findElement command, within a test being analyzed, the DOM Element Search Engine 406 finds the page element within the DOM that was stored when the command was executed in the test run under analysis. This page element is referred to as the candidate element, or identified DOM element 408. Once the candidate element is identified, the Locator Creation Engine 412 creates a set of locators by analyzing the page element and the associated DOM structure of the page wherein it exists. It creates a new set of locators that would successfully locate the element within the given DOM structure. Locator Creation Engine 412 also calculates a score for each locator that was created to produce a scored list of locators 414. This score can be used by a human, a machine learning engine, or the self-healing capabilities of the disclosure to determine the best locator to use in place of an existing locator.

For example, as a test is running a monitor may detect that a findElement command failed to find a page element using a given element locator. Normally, when a findElement command fails to find an element, the test will fail. However, the monitor can use a recommendations engine to get a scored list of alternate element locators that could be used to attempt to find the page element. The monitor could then choose one of the alternate element locators and use that to attempt to find the page element, in an attempt to "self-heal" the test and prevent it from failing. For example, it may choose the highest scored alternate element locator, or it may choose each element locator in succession until it finds one that works. If a chosen alternate element locator finds a page element, the test will continue instead of failing. In some embodiments, the scoring engine takes historical data about previous test runs into account as well as parameters set by a human about what type of locators are preferred over others.

In some embodiments, the DOM Element Search Engine 406 and the Locator Creation Engine 412 use a Command Matching Engine 404 to identify a command from a previous test run that matches the command under analysis. The DOM Element Search Engine 406 uses the associated DOM structure saved with the matched command to help identify the candidate page element. The Locator Creation Engine 412 uses the associated DOM structure saved for each matched command in previous runs of the same test to calculate a stability factor showing how well a locator of a given type would have worked when applied to each DOM structure in the history.

Figure 5:
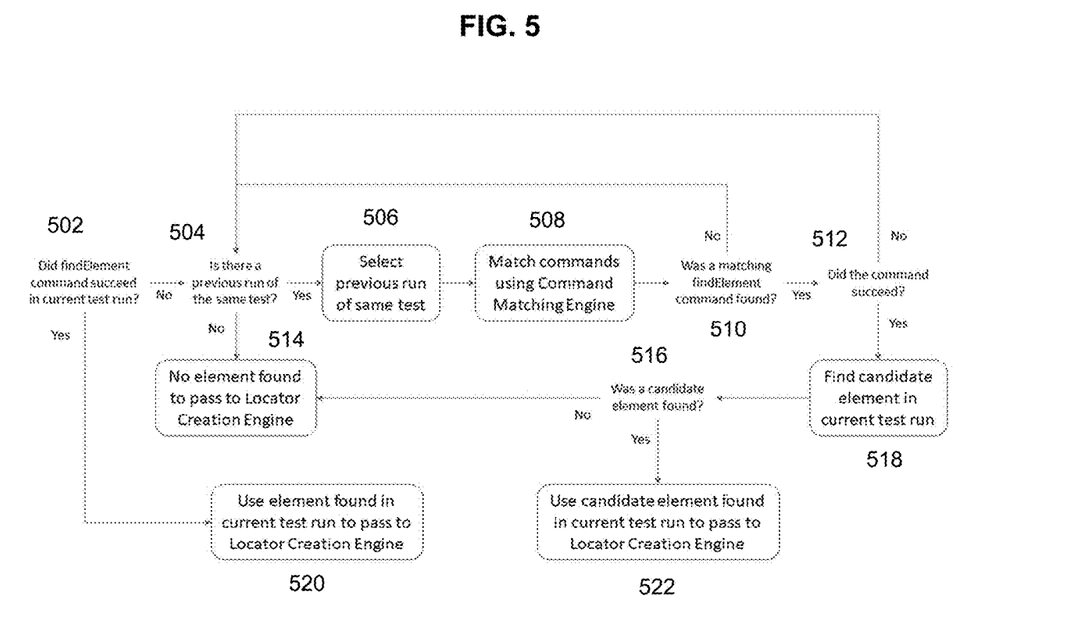
FIG. 5 depicts an exemplary process flow for a Document Object Model (DOM) element search engine, according to some embodiments of the disclosed invention.

FIG. 5 depicts an exemplary process flow for a DOM element search engine that operates on data saved into a recorded data repository by a monitor as it monitored a test run, according to some embodiments of the disclosed invention. When a given command, for example a findElement command, fails to find a page element using a given locator, it is typically because the page element has changed within the application under test in such a way that the locator no longer identifies the element. In most cases, the element is still on the page, but its position and/or properties are different. The DOM element search engine attempts to locate the element in the updated version of the page, to construct a different locator with which to find the element. In some cases, the element may have been completely removed from the page. In these cases, the DOM element search engine may find no candidate element. In some embodiments, when no candidate element is identified, the recommendations engine may suggest that the user enable self-healing of wait conditions (if it was disabled) to see if waiting longer would allow the element to be found (in case the wait condition timeout in the testcase is not long enough). In some embodiments, the recommendations engine may simply produce no recommended locators for the failing findElement command.

Referring to FIG. 5, for a given findElement command in a test run under analysis, the DOM element search engine first analyzes whether the command successfully found the element, as shown in block 502. When the command is successful, the element locator that was used in the command successfully found a page element. This page element is identified by the DOM element search engine as the element to pass to the locator creation engine, as shown in block 520. This scenario represents a case where the findElement command successfully found a page element using the given element locator, but the recommendations engine may attempt to produce a new possibly better set of element locators that could be provided to a user for them to manually use to improve the existing test.

When the given findElement command in a test run under analysis is not successful, no page element was found using the element locator specified by the test. In this case, the DOM element search engine will attempt to use data stored in a recorded data repository to identify an element on the page that appears to be a modified form of the element the test was attempting to find, so that it can pass that element to the locator creation engine to create an alternate set of locators that will find the element.

To accomplish this, the DOM element search engine first identifies whether a recorded data repository contains stored data for a previous run of the same test, as shown in block 504. If there is no stored data for previous runs of the same test, the recorded data repository contains insufficient information for the DOM element search engine to identify a page element to pass to the locator creation engine, as shown in block 514. In this case, the recommendations engine is unable to produce any alternate locators for the given findElement command.

When a recorded data repository contains stored data from a previous run of the same test, the DOM element search engine analyzes the stored data for the most recent run of the same test, as shown in block 506. The DOM element search engine uses a command matching engine to identify a findElement command in the test run that it selected that most closely matches the failing findElement command in the original test run being analyzed, as shown in block 508. In block 510, the DOM element search engine identifies whether the command matching engine was able to find a matching command. When it is unsuccessful, the DOM element search engine proceeds to determine whether the recorded data repository contains stored data for additional runs of the same test (block 504), and if so, it selects the next most recent run of the test for analysis (block 506) and the process repeats. The process repeats until a matching command is found in block 510, or there are no further test runs stored in the recorded data repository to analyze (block 514).

When the command matching engine successfully identifies a matching command in the historical test run under analysis (block 510), the DOM element search engine determines whether the findElement command successfully found the element in the test run under analysis, as shown in block 512. When the findElement command was unsuccessful in that test run, the DOM element search engine determines whether the recorded data repository contains additional test runs to analyze (block 504) and if so, selects the next most recent one to analyze (block 506).

When the matching findElement command in the historical test run under analysis successfully found a page element (block 512), the DOM element search engine uses data stored for the command (including the stored DOM) to attempt to find a candidate page element in the DOM stored for the findElement command in the current test run under analysis, as shown in block 518. When found, this candidate page element is identified as the element that was likely intended to be found by the original element locator defined in the test (block 522). When not found, no candidate page element is identified to pass to the locator creation engine (block 514).

In some embodiments, the DOM element search engine uses two strategies (processes), separately or in conjunction to attempt to find the candidate element: a DOM matching strategy (process) and a locator suggestion strategy (process).

Figure 6:
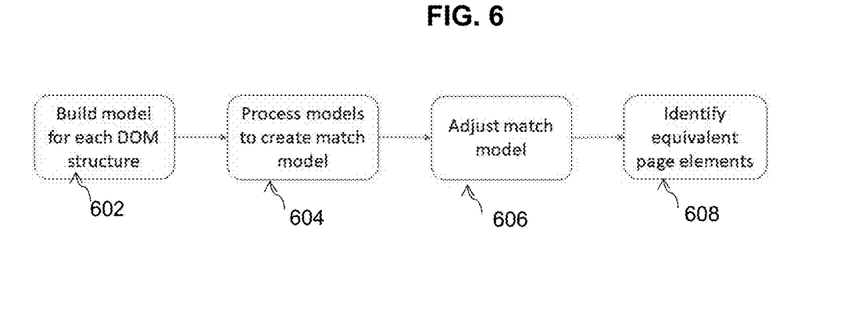
FIG. 6 illustrates an exemplary process flow for a DOM matching process, according to some embodiments of the disclosed invention.

FIG. 6 illustrates an exemplary process flow for a DOM matching process, according to some embodiments of the disclosed invention. As shown in block 602, the DOM element search engine first builds a model for the DOM structures associated with the findElement command in the historical test run and the findElement command in the current test run under analysis. In some embodiments, the model contains a node for each element in the DOM, and each node in the model contains relevant properties of the DOM element including its name and all attributes associated with it. The DOM element search engine then uses a model comparison process as shown in block 604, for example the open source Eclipse Modeling Framework™ (EMF) Compare library, to match nodes between the two models, by computing a similarity between nodes in each model based on their properties, and outputs the result as a match model where nodes are matched if their similarity score exceeds a certain threshold. In some embodiments, the DOM element search engine uses the open source EMF Compare library as the generic model comparison engine to define the models and compute the match model. As known in the art, the Eclipse Modeling Framework™ includes a generic comparison engine with the ability to export differences in a model patch.

There are some cases where DOM elements are different enough that they do not get matched to each other by the model comparison process, however logically the DOM elements should be matched because all other DOM elements in their vicinity in the model are matched. In these cases, the DOM element search engine adjusts the match model to create matches between nodes in block 606.

Figure 7:
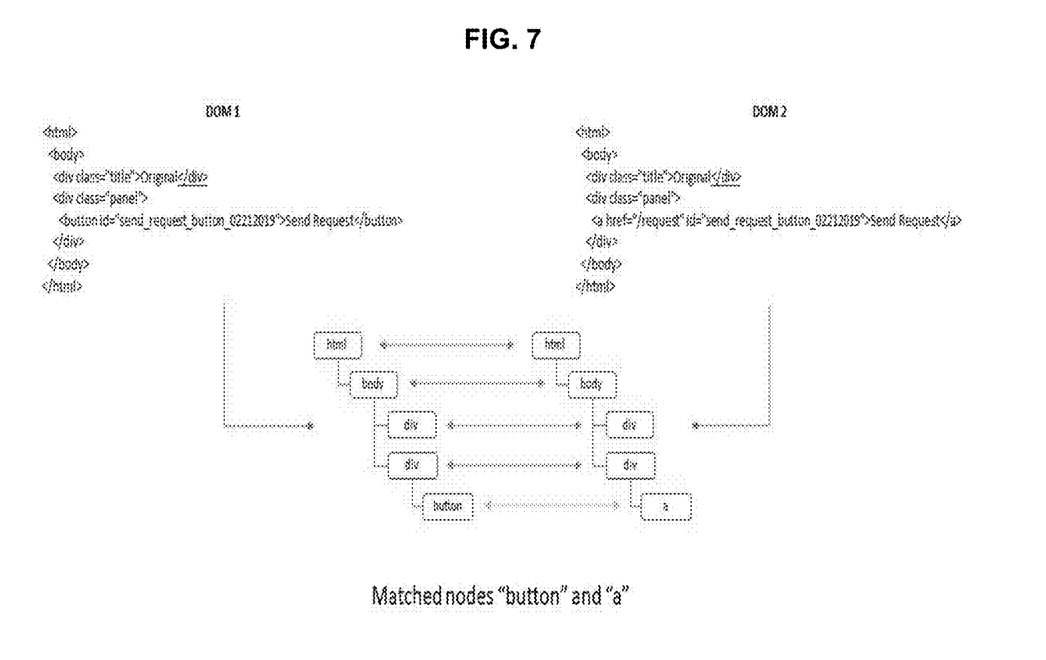
FIG. 7 illustrates an example for which matched models are adjusted, according to some embodiments of the disclosed invention.

FIG. 7 illustrates an example for which matched models are adjusted, according to some embodiments of the disclosed invention. In this example, the nodes "button" and "a" are different enough that they are not matched in the initial match model. As shown, each of the "button" and "a" nodes are a single child node of their respective parent "div" node, and the two parent "div" nodes are matched in the match model. When two parent nodes are matched and those nodes each have a single unmatched child node, the DOM element search engine adjusts the match model to create matches between the two child nodes.

Referring back to FIG. 6, once matching the models is completed, the DOM element search engine uses the match model to identify equivalent DOM elements between two different runs of the same test. Given the element that was found in the historical test run, the DOM element search engine then identifies the equivalent page element in the current test run under analysis as the candidate element that could not be found when the test was run, in block 608.

For the locator suggestion strategy, the DOM element search engine first operates on the DOM structure associated with the historical run of the test where the findElement command succeeded. The process uses a locator creation engine (described below) to define a set of (element) locators that would succeed in finding the element within that DOM structure. It then applies those locators to the DOM structure associated with the command within the current test run under analysis to see which page elements are identified using those locators. For each element that is identified, the DOM element search engine counts the number of times that that specific element gets identified by one of the locators, using the locator suggestion strategy. When only a single element is identified, that element is used as the candidate element with which the test tried to interact. When multiple elements are identified, then the element that was identified more times than any of the others is used as the candidate element with which the test tried to interact. When there is a tie between elements, or no elements were identified, the locator suggestion strategy produces no candidate element.

In some embodiments, the DOM element search engine uses the DOM matching strategy and the locator suggestion strategy in conjunction with each other to attempt to find the candidate element with which the test tried to interact. The DOM matching process generally takes longer to execute but is more likely to find a good match. The locator suggestion process executes faster but does not always return a matching element. In some embodiments, the DOM element search engine uses both strategies at the same time, where each of the strategies are started at the same time and executed in parallel.

In some embodiments, within a given initial timeout period (for example 3 seconds), the DOM element search engine repeatedly checks to see whether the DOM matching strategy has returned a result yet and when so, it returns that result. When the DOM matching strategy has not returned a result within the initial timeout period, the DOM matching strategy is allowed to continue processing. The DOM element search engine then checks whether the locator suggestion strategy has returned a result and when so, it returns that result. When not, the DOM element search engine waits for the DOM matching strategy to return a result or reach its total timeout period for providing a result. When neither strategy provides a result, no candidate element is identified by the DOM element search engine and the recommendations engine is unable to produce recommended locators. Using this approach, the DOM element search engine finds the "best" result while balancing the need to find the best match with the need to get a result in as small an amount of time as possible.

Figure 8:
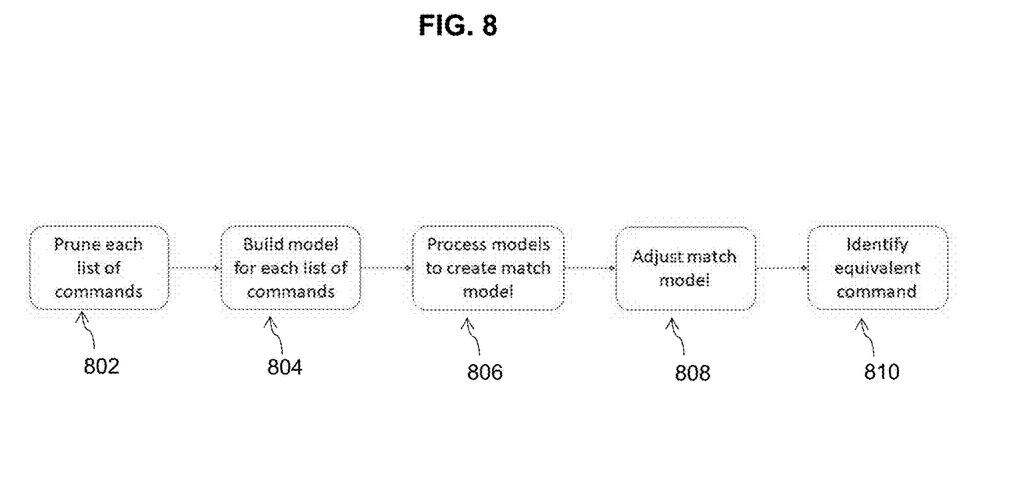
FIG. 8 shows an exemplary process flow for a command matching engine, according to some embodiments of the disclosed invention.

FIG. 8 shows an exemplary process flow for a command matching engine, according to some embodiments of the disclosed invention. As shown, the DOM element search engine and the locator creation engine use recorded data associated with equivalent commands (e.g., findElement commands) between different runs of the same test. However, the set of commands made by two different runs of the same test may be different. This difference can arise for various reasons. Firstly, between two different runs of the test, the user may modify the test in a way that injects, modifies and/or removes one or more commands. These modifications could have been made to make the test work against a new version of the application under test, or to add additional test steps to validate functionality in the application.

Secondly, the number of (findElement) commands that are made to find a specific element may vary from a first execution to subsequent executions. This can happen because the API that is invoked by the test to find an element repeats the commands as necessary until the element is found. The number of times the (findElement) command is made depends on how long it takes to find the element, which can vary based on environmental factors or the current state of the application. The number of commands may also vary between subsequent executions due to conditional logic in the test that executes specific commands based on the current state of the application (for example, a command that enables an option in the application only when the option is not already enabled). Since the list of commands can vary from a first execution to a second execution of a test, the DOM element search engine and the locator creation engine use a command matching engine to identify the equivalent commands between two different test runs.

In some embodiments, the command matching engine prunes out repeated commands that failed to find a specific page element from each list of commands, to account for the variation in number of findElement commands for that specific page element, as shown in block 802. Next, the command matching engine builds a model for each list of remaining commands, in block 804. In some embodiments, the model contains a node for each command in the list, and each node contains relevant properties of the command including the name of the command, data passed to the command, and (if relevant) the locator used to find the page element upon which the command acted.

The command matching engine then uses a generic model comparison engine to match nodes between the two models by computing a similarity between nodes in each model based on the properties of the node. In block 806, the command matching engine outputs the result as a match model where nodes are matched when their similarity score exceeds a certain threshold. In some embodiments, the command matching engine uses the open-source EMF Compare library as the generic model comparison engine to define the models and compute the match model.

There are some cases where commands get matched to each other by the generic model comparison engine in ways that are not optimal when matching commands. In those cases, the command matching engine adjusts the match model to remove and/or add matches as appropriate, as shown in block 808. First, it removes any matches where two commands are matched but their names are not the same (for example, it would remove a match between a findElement command and a click command). Next, it removes any matches where the locator types for matching findElement commands are not the same (for example, it would remove a match where one locator type was id and the other was xpath). Lastly, it removes any matches where the data values passed to matching findElement commands are too dissimilar, using a text similarity metric (for example, it would remove a match where one data value was "abc_id" and the other was "myelement").

After removing matches, the command matching engine identifies any groups of unmatched commands between the two models where each group has the same number of commands, and the command names are in the same order. For any such groups, it matches each command one by one in order between the two groups. Once the match model is completed, the command matching engine uses the match model to identify equivalent commands between the two different runs of the same test, in block 810.

In some embodiments, the locator creation engine creates a set of locators based on a given page element in a recorded DOM structure. Each locator produced by the locator creation engine is a different way of uniquely identifying that page element within its DOM. The locator creation engine contains locator creators that each attempt to create a specific type of locator, based on the type of the page element and properties contained by the element. Some examples include a locator creator that creates locators that search for links based on the text of the link, or a locator creator that creates locators that search for an element in a table cell based on the name of the column in which it resides and values in adjacent table cells. Some locator creators may produce more than one locator, each of which differs based on its location strategy (id, css selector, xpath, etc.) and/or whether it uses the entire value or partial value of a relevant element property on which it depends. However, a given locator creator may not always be able to create a locator for a given page element, since the locators it attempts to create may require properties that the page element or neighboring elements do not currently contain.

A given locator creator may use different location strategies in the different locators that it produces. For example, the "id" locator creator may produce locators that use either the id, css selector, or xpath location strategies to locate an element by its id property. For each location strategy for which it produces locators, the locator creator creates a locator for the page element that it is given, using the exact value of one or more properties of that element and/or neighboring elements in the DOM structure. For the same location strategy some locator creators may in addition attempt to create optimized locators that use a unique substring of the properties on which the locator creator depends, based on values of those properties throughout the history of the test runs. For example, an element's id property may have values that differ for each test run, like this: "id_123", "id_245", "id_356", etc. A locator based on id will not consistently find the element when it searches for the specific id "id_356". But an optimized locator that searches for an id that starts with the text "id_" will consistently find the element regardless of the value of the id property.

In some embodiments, to create optimized locators, the locator creator uses the command matching engine to find equivalent page elements to the given element in the stored data for all successful executions of the same test. For a given property (e.g. "id"), the locator creator collects the set of values that includes the value for that property in the given page element under analysis as well as all values for that property in the equivalent elements throughout the test history. When all values in the set are equal, then the locator creator creates no optimized locators. However, when the values in the set differ, the locator creator uses an algorithm to calculate unique common substrings that appear in all values within the set. When no unique common substrings are found, then the locator creator creates no optimized locators. But when common substrings are found, the locator creator will create optimized locators that use "starts with", "contains", or "ends with" logic based on where the substrings appear (at the beginning, somewhere in the middle, or at the end of the value). Multiple optimized locators may be created for each location strategy.

In some embodiments, the locator creation engine assigns a "score" (or "confidence factor") to each locator that it produces. A tester can use this score to help decide which locator to use to update the test. Alternatively, or in addition, a monitor can use this score to determine which locator(s) to use to attempt to self-heal a test when it is about to fail due to a findElement command being unable to find an element.

In some embodiments, the score is assigned using two different factors:
1. How often a locator of the type created by the given locator creator would have had a consistent value when created against the DOMs stored for all successful executions of the equivalent findElement command in the recorded data repository—this can be considered the "stability" of the locator; and
2. Weights given to each location strategy produced by each locator creator, which allow the engine to prefer one type of locator over another.

For each locator produced by a given locator creator that uses a given location strategy, the locator creation engine calculates how often a locator with a consistent value would have been created across all executions of the test. It does this by using the command matching engine to find equivalent page elements to the given element in all successful executions of the same findElement command. For each of these, the locator creation engine uses the locator creator to create a locator that uses the particular location strategy. The locator creation engine adds the locators created for each successful element in the test history as well as the locator that it is attempting to score to a list of locators for the given page element. The locator creation engine then identifies which locator appears within the list of locators the greatest number of times, and then divides the number of times that value appears by the total number of locators within the list. This creates a stability factor for the locator.

In some embodiments, the locator creation engine also identifies a weight that corresponds to a given location strategy produced by the locator creator. This weight may have default values assigned to it and may have been previously configured by a user of the software. The locator creation engine multiplies the weight by the stability to calculate a score for a given locator. One skilled in the art would recognize that this is a simple way to calculate a score; other more complex approaches may also be used to calculate the score. For example, recent history can be weighted more heavily than more distant history when calculating the stability factor, since the application under test may have undergone more drastic changes the farther back in history you go. There are many other known ways that the score can be calculated, as well.

Figure 9:
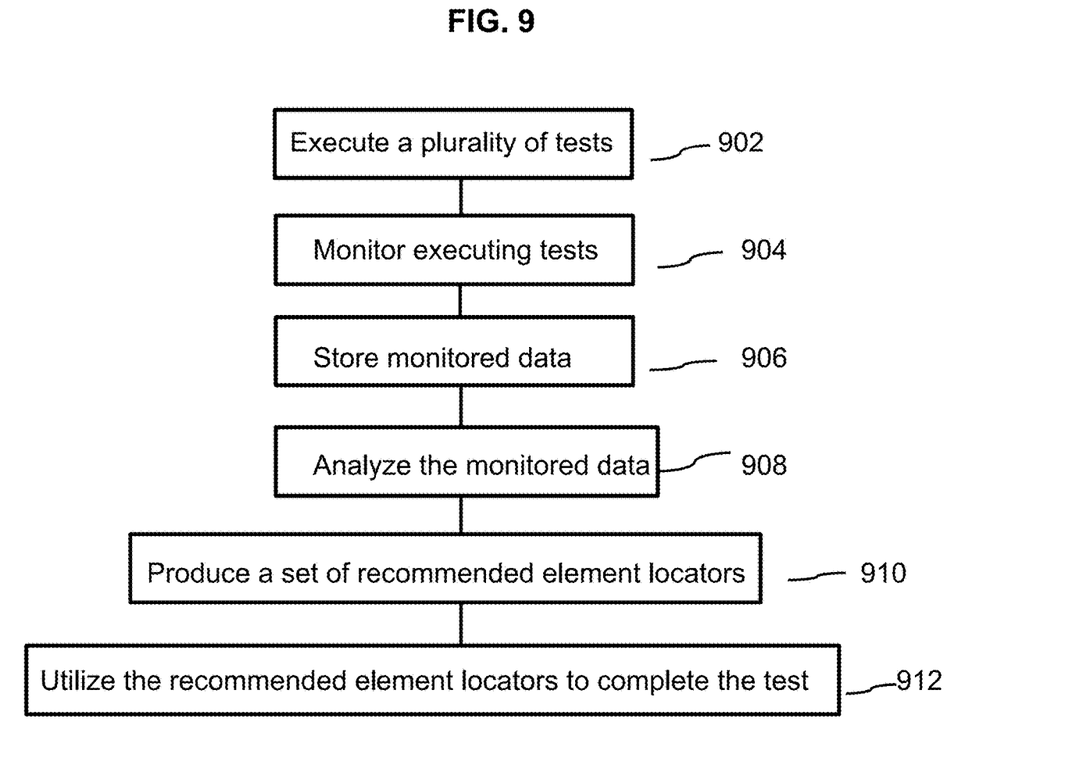
FIG. 9 is an exemplary process flow for locator recommendations for a UI application, such as a web application, according to some embodiments of the disclosed invention.

FIG. 9 is an exemplary process flow for locator recommendations for a UI application software, such as a web application, by a test tool, according to some embodiments of the disclosed invention. As depicted in block 902, a plurality of tests is executed by an interface automation test tool, such as Selenium™. The tests (test cases) contain code that performs calls to an interface of the test tool, such as Selenium™ APIs, which describe what steps are to be taken to test a UI application. In block 904, the tests are monitored as they are executed. The commands of the test tool that are called by each test being executed are observed to generate monitored data. The monitored data includes which tests were executed, element locators that were used in the tests, relevant commands that were called by each test and related to the element locators that were used in the tests, and information about the UI application software during the test execution. In some embodiments, the monitored data can include which tests were executed, the element locators that were used, the test tool commands that were called by each test, and other data about the test execution or the state of the application during the test.

In block 906, the monitored data are stored in a recorded data repository. When a given command in a test run under analysis is not successful, that is, no page element was found using the element locator specified by the test, the DOM element search engine attempts to use data stored in the recorded data repository to identify an element on the page that appears to be a modified form of the element the test was attempting to find, so that it can pass that element to the locator creation engine to create an alternate set of locators that will find the element.

In block 908, the monitored data stored in the recorded data repository is analyzed. Within the test being analyzed, a page element within the DOM that was stored when the command was executed in the test run under analysis is found. In block 910, a set of recommended element locators are produced to be used by the test tool in place of previously used element locators for which the elements were not found during the execution of the tests. In some embodiments, a Locator Creation Engine identifies a command from a previous test run that matches the command under analysis. In some embodiments, a DOM Element Search Engine uses the associated DOM structure saved with the matched command to help identify the candidate page element. In some embodiments, the page element is identified by matching a DOM structure in a test run under analysis with a DOM structure from a previous test run, or by creating a second set of locators for an associated DOM structure for a previous test run and using the second set of locators to identify the associated page element.

In block 912, the set of recommended element locators is used to complete the testing of the UI application software. As explained above, a "self-healing of wait conditions," which may be enabled or disabled by users, may be performed. For example, when a test is about to fail because an element cannot be found, the monitor may inject additional time for a wait condition to complete, in case the timeout specified for the wait condition in the testcase was not long enough and waiting longer would allow it to complete successfully. In some embodiments, the monitor 104 may also reconfigure a wait condition to ignore certain types of exceptions, in cases when they get thrown during the execution of the wait It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims and drawings.

What is claimed is:

1. A method for element locator recommendations for testing a User Interface (UI) application software by a test tool, the method comprising: executing a plurality of tests by the test tool; monitoring tests as they are executed and observing which commands of the test tool are called by each test being executed to generate monitored data, wherein the monitored data includes which tests were executed, element locators that were used in the tests, relevant commands that were called by each test and related to the element locators that were used in the tests, and information about the UI application software during the test execution; storing the monitored data in a recorded data repository; analyzing the monitored data stored in the recorded data repository; producing a set of recommended element locators to be used by the test tool in place of previously used element locators for which elements were not found during the execution of the tests; when a wait condition is a test, injecting additional time for the wait condition to complete; producing a confidence factor for each recommended locator, wherein the confidence factor is based on how often a locator of same type would have had a consistent value when created for each of a plurality of historical test executions; and utilizing the confidence factors to select a recommended element locator form the set of recommended element locators to complete the testing of the UI application software.

2. The method of claim 1, further comprising storing data for each relevant command.

3. The method of claim 2, wherein the stored data for each relevant command includes an element locator for a page element associated with the relevant command, data passed to the relevant command, and a current Document Object Model (DOM) structure of the UI application software associated with the relevant command at a moment that the relevant command is executed.

4. The method of claim 3, wherein the stored data for each relevant command further includes command name, whether the command succeeded or failed, an absolute XPath to the page element that was found using the element locator within the DOM structure of the page.

5. The method of claim 3, wherein analyzing the monitored data comprises identifying a page element within the DOM structure that was stored when the command was executed.

6. The method of claim 5, further comprising creating a set of locators by analyzing the identified page element and the associated DOM structure of a page that includes the identified page element.

7. The method of claim 6, further comprising utilizing the associated DOM structure to identify the page element, and identifying the relevant command from a previous test run that matches the relevant command under analysis.

8. The method of claim 7, wherein the page element is identified by matching the DOM structure.

9. The method of claim 7, wherein the page element is identified by creating a second set of locators for an associated DOM structure for a previous test run and using the second set of locators to identify the associated page element.

10. The method of claim 1, further comprising utilizing the set of recommended element locators to produce a report to improve the tests.

11. The method of claim 1, wherein monitoring tests as they are executed comprises monitoring application programming Interface (API) calls made by the tests being executed and the test tool, and storing data from the API calls.

12. The method of claim 1, wherein the plurality of tests are Java™ classes and are stored within a source control management system, and wherein the monitoring is performed as a Java Agent™.

13. The method of claim 1, further comprising when an element cannot be found, injecting a wait condition to complete the test.

14. A system for element locator recommendations for testing a User Interface (UI) application software comprising: a software test tool for executing a plurality of tests by the test tool; a monitor for monitoring tests as they are executed and observing which commands of the test tool are called by each test being executed to generate monitored data, wherein the monitored data includes which tests were executed, element locators that were used in the tests, relevant commands that were called by each test and related to the element locators that were used in the tests, and information about the UI application software during the test execution; a data repository for storing the monitored data; and a locator creation engine for analyzing the monitored data stored in the data repository, producing a set of recommended element locators to be used by the test tool in place of previously used element locators for which elements were not found during the execution of the tests, when a wait condition is a test, injecting additional time for the wait condition to complete, and producing a confidence factor for each recommended locator, wherein the confidence factor is based on how often a locator of same type would have had a consistent value when created for each of a plurality of historical test executions; and wherein the software test tool utilizes the confidence factors to select a recommended element locator form the set of recommended element locators to complete the testing of the UI application software.

15. The system of claim 14, wherein data for each relevant command includes an element locator for a page element associated with the relevant command, data passed to the relevant command, whether the command succeeded or failed, an absolute XPath to the page element that was found using the element locator within the DOM structure of the page, and a current Document Object Model (DOM) structure of the UI application software associated with the relevant command at the moment that the relevant command is executed.

16. The system of claim 15, wherein analyzing the monitored data comprises identifying a page element within the DOM structure that was stored when the command was executed.

17. The system of claim 15, wherein the locator creation engine creates a set of locators by analyzing the identified page element and the associated DOM structure of a page that includes the identified page element, and utilizing the associated DOM structure to identify the page element, and identifying the relevant command from a previous test run that matches the relevant command under analysis.

18. The system of claim 17, wherein the page element is identified by matching the DOM structure.

19. The system of claim 17, wherein the page element is identified by creating a second set of locators for an associated DOM structure for a previous test run and using the second set of locators to identify the associated page element.

20. The system of claim 14, wherein the software test tool utilizes the set of recommended element locators to produce a report to improve the tests.

* * * * *